United States Patent [19]

Timoc

[11] 4,308,616
[45] Dec. 29, 1981

[54] STRUCTURE FOR PHYSICAL FAULT SIMULATION OF DIGITAL LOGIC

[76] Inventor: Constantin C. Timoc, 742 Galaxy Height Dr., La Canada, Calif. 91011

[21] Appl. No.: 43,506

[22] Filed: May 29, 1979

[51] Int. Cl.³ .......................................... G06F 11/22
[52] U.S. Cl. ................................................ 371/23
[58] Field of Search ...................... 371/23; 324/73 R

[56] References Cited

U.S. PATENT DOCUMENTS

| 3,790,885 | 2/1974 | James | 324/73 R |
| 3,815,025 | 6/1974 | Jordan | 324/73 R |
| 4,204,633 | 5/1980 | Goel | 371/23 X |

OTHER PUBLICATIONS

Maiden et al., "Error Injector Probe", *IBM Tech. Disclosure Bulletin*, vol. 18, No. 1, Jun., 1975, pp. 7–8.
Barnshaw, "Electronic Fault Injection Device", *IBM Tech. Disclosure Bulletin*, vol. 16, No. 10, Mar., 1974, pp. 3176–3178.
Tsiang et al., "Automatic Trouble Diagnosis of Complex Logic Circuits", *The Bell System Technical Journal*, vol. 18, No. 10, Mar. 1974, pp. 1177–1200.

*Primary Examiner*—David H. Malzahn
*Attorney, Agent, or Firm*—Wagner & Bachand

[57] ABSTRACT

A shift register connected to elementary gates is added to a digital network to form a fault simulator. The shift register and the additional gates can select a connection from the digital network and simulate a fault on the selected connection. Connection selection is done at a speed comparable to that at which the digital network operates and fault simulation is nondestructive. By resetting the shift register the fault simulator performs as if the digital network were fault-free. To simulate certain faults in the digital network a predetermined fault injection pattern for the faults to be simulated is entered into the shift register.

7 Claims, 5 Drawing Figures

TRUTH TABLE FOR FIG. 2

| SIMULATION SIGNAL | Q | Q̄ | OR GATE 16 OUTPUT | AND GATE 26 OUTPUT |
|---|---|---|---|---|
| 00 | 0 | 1 | DATA | DATA |
| 01 | 0 | 0 | DATA | 0 |
| 10 | 1 | 1 | 1 | DATA |
| 11 | 1 | 0 | 1 | 0 |

TRUTH TABLE FOR FIG. 4

| SIMULATION SIGNAL | Q | Q̄ | OR GATE 50 OUTPUT | AND GATE 51 OUTPUT |
|---|---|---|---|---|
| 00 | 0 | 1 | DATA | DATA |
| 01 | 0 | 0 | DATA | 0 |
| 10 | 1 | 1 | 1 | 1 |
| 11 | 1 | 0 | 1 | 0 |

STRUCTURE FOR PHYSICAL FAULT SIMULATION OF DIGITAL LOGIC

BACKGROUND OF THE INVENTION

This invention relates to fault simulation of digital circuits, and more particularly to structure for physical fault simulation of connections between digital circuits.

A technique for simulating faults in digital circuits known as physical fault simulation, consists of selecting a connection from a digital network comprising a plurality of connections and forcing said selected connection to one of the logic levels. Said selected connection is forced to said logic level, thus simulating a fault, while input test patterns are applied at the digital network inputs in order to determine whether or not the digital network response to the input test patterns in the presence of said simulated fault is different than that of the digital network response without said simulated fault.

Physical fault simulation of a large digital network, comprising thousands of digital circuits and tens of thousands of connections between said digital circuits, is complicated by the fact that at least one connection has to be selected from said tens of thousands of connections in order to force said selected connection to one of the logic levels, independent of what the normal logic level may be on said selected connection. In order to speed up the physical fault simulation activity, selecting a connection and injecting a fault in said selected connection should be performed at speeds comparable to those at which input data can be applied to said digital circuits.

Known prior art has suggested the use of connection selection and fault injection techniques for performing physical fault simulation of digital circuits. However, in some of the known prior art cases, fault injection increases the power dissipated in the digital circuits associated with the connection at which a fault is injected, thus running into the danger of damaging said digital circuits. In other known prior cases, connection selection and fault injection is accomplished at speeds much slower than those at which input data can be applied, thus extending physical fault simulation in excessive time.

SUMMARY OF THE INVENTION

Thus, it is one object of this invention to provide digital logic structure which can select a connection from a digital network comprising a plurality of connections at speeds comparable to those at which input data can be applied to said digital network and to force said selected connection to one of the logic levels for any lengths of time without damaging said digital circuits.

One further object of this invention is to provide a physical fault simulator capable of selectively simulating a stuck-at (0) condition or a stuck-at (1) condition at the input or output of a digital circuit.

Additionally, the fault simulators of this invention allow the unimpeded transmission of data between digital circuits when fault simulation is not desired.

Other objects and a fuller understanding of the invention may be had by referring to the following description and claims, taken in conjunction with the accompanying drawing.

DESCRIPTION OF THE PREFERRED EMBODIMENT

Figure 1:
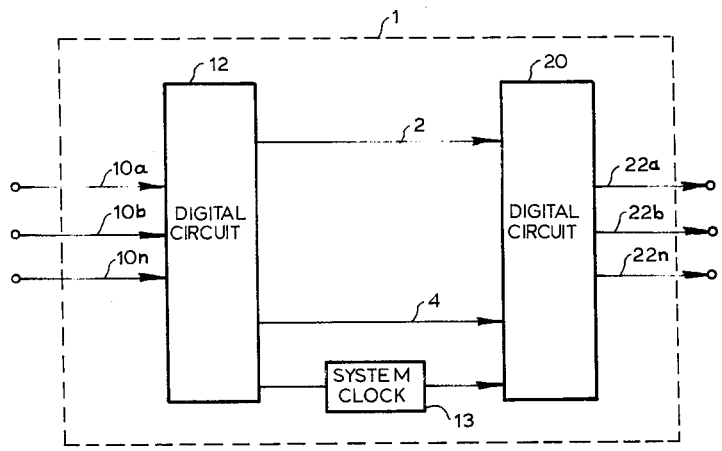
FIG. 1 is a schematic diagram illustrating a digital network comprising two interconnected digital circuits.

Now referring to FIG. 1, a digital network 1, best represented as a single box having a plurality of inputs $10a-n$ and a plurality of a outputs $22a-n$, comprises digital circuits 12 and 20. Said digital circuits 12 and 20 are connected by a communications link represented by wires 2 and 4. Digital network 1 is said to perform a fault-free logic function as long as no faults exist in said digital network 1.

Digital network 1 may be a simple modulator or multiplexer, or may be a complex system made up of many conventional or unique data handling devices making up a network. The system includes some clock or synchronizing source 13, shown for convenience as directly connected to each of the digital circuits 12 and 20, making up the digital network 1.

The network 1 of FIG. 1, for reliable operation, needs to have some capability for the introduction of faults under the control of the network monitor or automatically to verify system operation.

Figure 2:
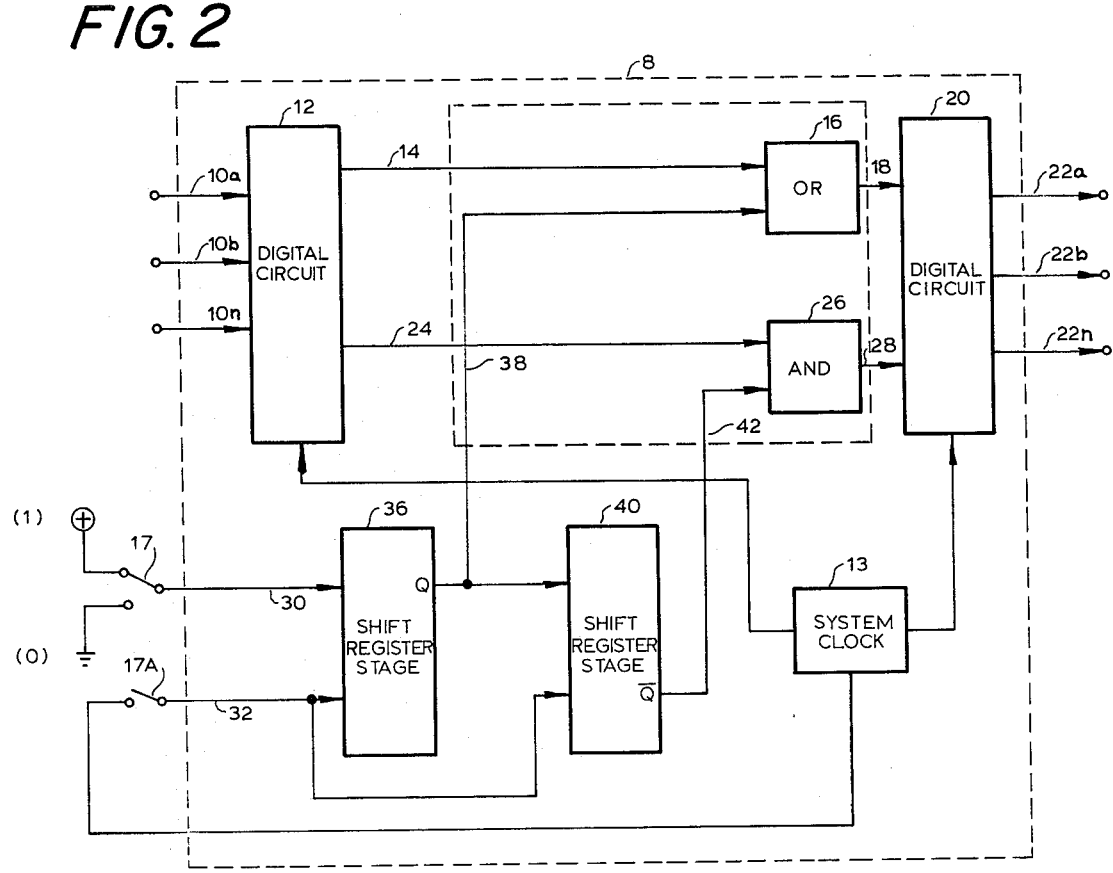
FIG. 2 is a schematic diagram of a fault simulator structure for the digital network shown in FIG. 1, embodying the principles of my invention, using a shift register and elementary gates in order to select a connection from the digital network comprising a plurality of connections and to force said selected connection to one of the logic levels, thus simulating a so called "stuck"-fault on said selected connection.

FIG. 2 shows a fault simulator 8, for the digital network 1 shown in FIG. 1, that can simulate stuck-at-high (1) and stuck-at-low (0) faults on the connections between digital circuits 12 and 20, in addition to enabling a fault-free flow of information between digital circuit 12 and digital circuit 20. Fault simulator 8 comprises, in addition to digital circuits 12 and 20, gates 16 and 26 interconnected with shift register stages 36 and 40. Gates 16 and 26 are interposed in the transmission paths from digital circuit 12 to digital circuit 20 in order to selectively enable or disable the fault-free flow of data and the injection of stuck-faults on said transmission paths.

The plurality of shift register stages 36 and 40 are known to those skilled in the art as a serial-in and parallel-out shift register. Its operation is described as follows: Data is entered into register stage 36 from a fault simulation controller represented by switch 17 and 17A in the serial data input line 30. Also, said fault simulation controller 17 and 17A provides a series of shift clock signals at input 32. Shift clock pulses on line 32 may be from system clock 13 or from a separate clock.

Each time the shift clock signal applied at input 32 changes from a low to a high logic level, the data applied at serial data input 30 is stored in shift register stage 30. Data at serial data input 30 originates at signal source 17 which is represented as a binary switch capable of generating (1)s represented by a positive (+) voltage or (0)s represented by ground potential. The operation of switch 17 provides a train of test data bits.

Concurrently, the data from shift register stage 36 is transferred to shift register stage 40. The data stored in the shift register stages 36 and 40 appear at parallel data outputs 38 and 42, respectively.

The function of gates 16 and 26 is well known to those skilled in the art. Gate 16 performs the logical OR function of the logic levels appearing on wires 14 and 38. Gate 26 performs the logic AND function of the logic levels appearing on wire 24 and wire 42.

OPERATION OF THE INVENTION

A fault-free logic flow of information between the primary inputs 10 and the primary outputs 22 of logic network 1 is shown in FIG. 1. In order to be able to simulate stuck-at-high (1) and stuck-at-low (0) faults, gates 16 and 26 together with shift register stages 36 and 40 are added to network 1, thus forming a fault simulatable circuit 8 as shown in FIG. 2. Said fault simulator 8, in addition to simulating stuck-faults in digital network 1, can also simulate fault-free network 1.

Figures 3, 4, 5:
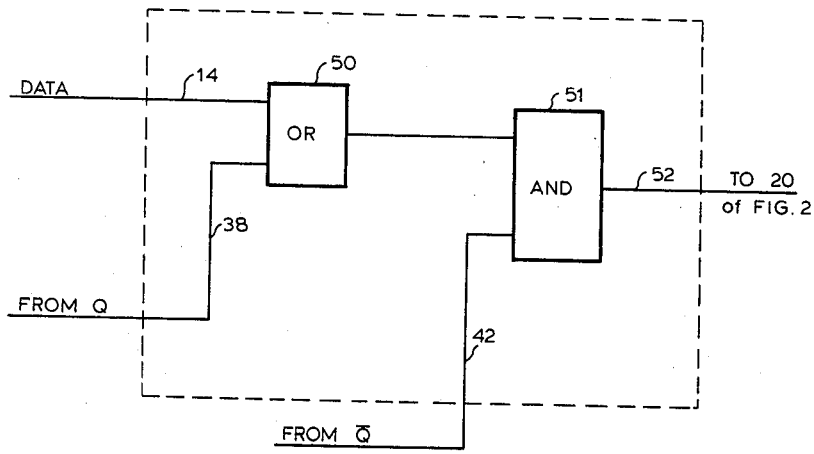
FIG. 3 is a truth table for the embodiment of FIG. 2.
FIG. 4 is an alternate embodiment of the logic of this invention.
FIG. 5 is a truth table for the embodiment of FIG. 4.

In order to establish a fault-free flow of information between primary inputs 10 and primary outputs 22a–n of fault simulator 8, a low (0) logic level is stored in shift register stages 36 and 40 from fault simulator controller (1) 17 and 17A by applying a train of at least 2 (0)s at wires SERIAL DATA IN 30. This condition is illustrated in FIG. 3 as Line 1 of the truth table. Under this input condition, the output Q of shift register stage 36 is low or (0) and $\bar{Q}$ of shift register stage 40 is high or (1). A low signal from stage 36 applied over lead 38 to OR gate 16 allows data on lead 14 to pass through gate 16 to lead 18 and thence to digital circuit 20 uninterrupted.

The $\bar{Q}$ output of shift register 40 on lead 42 being high or 1 is applied over lead 42 supplys the enabling input to AND gate 26 to allow data on lead 24 to pass through AND gate 26 to lead 28 and to digital circuit 28.

Thus under the conditions of line 1 of the truth table of FIG. 3 the fault simulation elements including source 17, shift register stages 36 and 40 and particularly gates 16 and 26 are transparent to data and operationally the system is the equivalent of FIG. 1.

Where a train of pulses of a (1) followed by an (0) is produced by source 17 as shown in line 2 of the truth table of FIG. 3, the value of $\bar{Q}$ on lead 38 is low allowing data on lead 14 to pass through OR Gate 16. Simultaneously the value of $\bar{Q}$ on lead 42 is similarly low. The absence of a high value (1) on lead 42 blocks AND Gate 26 and lead 28 shows a stuck-at-low condition to digital circuit 20.

With a signal sequence from source 17 of a low or (0) followed by a high or (1) as represented by line 3 of the truth table of FIG. 3, the reversed ultimate condition exists.

Namely, the output Q of shift register 36 is high or (1) producing a data blocking condition stuck-at-high at Gate 16. Simultaneously the $\bar{Q}$ output of shift register stage 40 is high or (1) enabling Gate 26 and data on lead 24 passes uninterrupted through Gate 26 to lead 28 and to digital circuit 20.

Where a train of (1)'s is produced by source 17, as shown on line 4 of the truth table of FIG. 2, the Q output of stage 36 is high or (1), which over leads 38 locks OR gate 16 at a high condition preventing data on lead 14 from passing through gate 16. Simultaneously, the $\bar{Q}$ output of shift register stage 40 is low. Thus the enabling input to AND gate 26 is missing and data on lead 24 is blocked. Under these conditions the input to circuit 20 on lead 18 is stuck at high or (1) and the input to the same circuit on lead 28 is stuck at low or (0).

It may therefore seem by reference to FIG. 3 that the four combinations of two bit sequences from source 17 produces four different combinations of conditions at circuit 20 input namely:

(1) uninterrupted data on both leads 18 and 28
(2) data on lead 18
    lead 28 stuck at low
(3) data on lead 28
    lead 18 stuck at high
(4) lead 18 stuck at high
    lead 28 stuck at low These combinations furnish more than adequate requirements for fault simulation of 3 combinations plus uninterrupted data flow. Typically the elements of the combination 8 of FIG. 1 producing these conditions are used during the design and checkout phases of circuits 12 and 20 and are thereafter eliminated from the final circuitry to provide a configuration as shown in FIG. 1. However, with the recent advances in low cost high density integrated circuits it is possible to integrate the entire circuit 8 of FIG. 2 into the final design and have the fault simulation capability available throughout the life of the system.

While the subject invention has been described with only one shift register, it will be apparent to those skilled in the art that the basic concept of this invention could be implemented with a plurality of shift registers. If both stuck-at-high and stuck-at-low are necessary on the same connection, gates 16 and 26 may be connected in series.

FIG. 4 illustrates a series combination of an OR gate 50 and an AND gate 51 which may be substituted for the combination of gates 16 and 26 of FIG. 2.

In this alternate embodiment of FIG. 4 OR gate 50 is the direct equivalent of OR gate 16 of FIG. 2. It receives data from either lead 14 or 24 as the case may be in FIG. 2 as well as the Q input over lead 38 from shift register stage 36 of FIG. 2. The output of OR gate 50, however, constitutes the data input to gate 51. This is the equivalent of lead 24 of FIG. 2. The $\bar{Q}$ input on lead 42 comprises the second input to AND gate 51 and its output lead 52 is the equivalent to lead 28 of FIG. 2.

The logic of the embodiment of FIG. 4 is different from that of FIG. 2 as is illustrated by the truth table of FIG. 5.

Refer now to FIG. 5 in connection with FIG. 4 and by comparison with the truth table of FIG. 3. Again a condition representing a train of at least to (0)s from source 17 as applied directly to shift register stage 36 and indirectly to stage 40 allows data to flow uninterrupted through the circuit. This again is illustrated by line 1 of the truth table.

Where the simulation signal from source or switch 17 is a (1) followed by a (0), data passes through OR gate 50 since the Q input on lead 38 to gate 50 is low. The $\bar{Q}$ input on lead 42 to AND gate 51 is also low so AND gate 51 is in a blocking condition and output lead 52 is stuck at low.

An opposite condition or output lead stuck at high is accomplished, as illustrated on line 3 of the truth table of FIG. 5. By applying a (0) followed by a (1) to lead 30 of FIG. 2 with the logic circuit of FIG. 4 being used, the following occurs:

The Q output on lead 38 is high locking the the output of OR gate 50 in a high or 1 condition;

The $\overline{Q}$ signal on lead 42 is also high, enabling AND Gate 51

The stuck at 1 condition of OR Gate 50 is passed through Gate 51 to lead 52

Thus, either a stuck-at-high (1) or stuck-at-low (0) condition may be selected merely by the use of a two-bit sequence either 1,0 or 0,1. The application of a three-bit sequence 1,0,1 produces in sequence, a low (0) followed by a high (1) to digital circuit 20 regardless of the input data on leads 10a–n of FIG. 2.

A stuck on (0) condition is also achieved by a train of ones (1)'s being applied from simulation source 17. This is illustrated on line 4 of FIG. 5.

It will thus be appreciated by those skilled in the art that the present invention provides a digital logic structure that can select a connection from a plurality of connections to simulate faults on said selected connection at speeds comparable to those at which data can be switched on said connection and without damaging said digital circuits.

While the invention has been described with reference to a particular embodiment, the description is for illustration purposes and is not to be construed as limiting the scope of the invention. It will be understood by those skilled in the art that various modifications and changes in form and in detail may be made without departing from the true spirit and scope of the invention as defined by the appended claims.

The above described embodiments of this invention are merely descriptive of its principles and are not to be considered limiting. The scope of this invention instead shall be determined from the scope of the following claims, including their equivalents.

I claim:

1. A physical fault simulator for insertion between a pair of digital data circuits for selectively inserting predetermined fault conditions or to allow the uninterrupted flow of data between said pair of digital data circuits comprising:
    a source of fault simulation signals comprising either (1)s or (0)s;
    at least one memory stage;
    connection means from said source of fault simulation signals and said one memory stage for selectively introducing simulation signals into said one memory stage to produce at least one binary (1) output of said one memory stage;
    an OR gate connected in a data flow path between said digital circuits;
    said memory stage connected to an input to said OR gate to furnish a binary (1) input thereof;
    whereby data flows uninterrupted between the pair of digital data circuits in the presence of a binary (0) signal from said memory stage and the input to said second of the pair of digital circuits direct, appears stuck at the signal condition at the output of said memory stage in the presence of a binary (1) signal therefrom.

2. The combination in accordance with claim 1 including
    a second memory stage,
    means for deriving a binary signal output therefrom;
    an AND gate having first and second inputs and a single output with the first input coupled to the output of said first digital data circuit and the output of said AND gate coupled to the input of said second of the pair of digital data circuits;
    the inverted output of said second memory stage coupled to the second input of said AND gate;
    whereby said second memory stage connected to said AND gate, selectively simulates a stuck-at (0) condition at the input of said second digital data circuit in the presence of a binary (0) at the inverted output of said second memory stage and in the presence of a binary (1) at the inverted output of said second memory stage allows uninterrupted passage of data between said first and second digital data circuits.

3. The combination in accordance with claim 2 wherein said second memory stage is coupled to the output of said first memory stage to be driven thereby.

4. The combination in accordance with claim 3 wherein said second memory stage is coupled to said first memory stage to simultaneously store an opposite binary value to the inverted output of said second memory stage.

5. The combination in accordance with claim 1 wherein said means for introducing simulation signals comprises a source of a train of at least two binary values.

6. The combination in accordance with claim 1 including connection means synchronizing said simulation signal introducing means with the data rate of said digital data circuits.

7. A physical fault simulator for introducing selected binary (1)s or (0)s fault conditions or to allow the uninterrupted flow of data between a pair of inter-connected digital data circuits comprising:
    a source of a train of at least two binary values which values constitute fault simulation signals;
    a first memory stage for storing at least one binary value;
    a second memory stage for storing at least one binary value;
    said source coupled to said first and second memory stages to store succeeding binary values therein;
    an OR gate having a first input coupled to a data output of said first of the pair of digital data circuits;
    the output of said first memory stage being coupled to the second input of said OR gate;
    an AND gate having a first input coupled to the output of said OR gate and a second input coupled to the output of said second memory stage and the output of said AND gate coupled to a data input of said second of said pair of digital data circuits;
    whereby said simulation circuit allows the uninterrupted flow of digital data between the pair of digital data circuits when a binary (0) is present at the output of said first memory stage and a binary (1) is present at the output of said second memory stage; and
    whereby selective stuck-at (0) and stuck-at (1) is simulated by the selection of sequential (1) and (0) combinations of said source of fault simulation signals.

* * * * *